United States Patent [19]

Pohjala

[11] Patent Number: 4,904,224

[45] Date of Patent: Feb. 27, 1990

[54] HARVESTING MACHINE

[76] Inventor: Lauri Pohjala, Kaukola, SF-38210 Vammala, Finland

[21] Appl. No.: 200,079

[22] Filed: May 27, 1988

Related U.S. Application Data

[63] Continuation-in-part of Ser. No. 893,315, Jul. 22, 1986, abandoned.

[51] Int. Cl.[4] .......................... A01F 7/04; A01F 12/40
[52] U.S. Cl. ........................................ 460/59; 460/61; 460/65
[58] Field of Search ................ 130/27 M, 27 T, 27 H, 130/275, 28; 56/146; 460/59, 61, 65-70, 75, 76

[56] References Cited

U.S. PATENT DOCUMENTS

| | | | |
|---|---|---|---|
| 1,884,153 | 10/1932 | Nye | 130/27 M |
| 1,907,035 | 5/1933 | Baldwin | 130/27 M |
| 2,275,392 | 3/1941 | Metchef | 130/27 M |
| 2,880,734 | 4/1959 | Edstrom | 130/27 M |
| 2,905,182 | 9/1959 | Wise | 130/27 M |
| 3,808,780 | 5/1974 | Wood | 130/27 M |
| 4,154,250 | 5/1979 | Stuban | 130/27 H |
| 4,178,942 | 12/1979 | Nusser | 130/27 T |
| 4,198,802 | 4/1980 | Hengen et al. | 56/14.6 |
| 4,284,086 | 8/1981 | Williams | 130/27 T |
| 4,422,462 | 10/1983 | Decoene | 130/27 M |
| 4,461,306 | 7/1984 | De Busscher | 130/27 T |

Primary Examiner—Thuy M. Bui
Attorney, Agent, or Firm—McGlew & Tuttle

[57] ABSTRACT

A harvesting machine for feeding seed plants such as grain into the machine includes a threshing unit and a sieve set for threshing the seed plant and for separating the seeds from the rest of the vegetable material. The seeds are removed from the machine and the residual vegetable material is removed. The threshing unit includes a drum and beaters or flails. The drum is conical and is fitted in the apparatus in a vertical position so that it widens from the bottom towards the top, and the flails are installed on the outer surface of the drum. The sieve set is formed of at least two sieves which are at least partly conical and are nested and a threshing space is located in between the drum and the sieve set. An outer shroud is conical, and the threshing unit and the sieve set are fitted inside the shroud and in between the sieve set and the shroud there is a collecting bin for the seeds and an opening is provided for removing them.

14 Claims, 6 Drawing Sheets

4,904,224

HARVESTING MACHINE

CROSS REFERENCE TO RELATED APPLICATION

This is a Continuation-in-Part of Ser. No 893,315, filed July 22, 1986 now abandoned.

FIELD AND BACKGROUND OF THE INVENTION

The invention relates to a harvesting machine for threshing and sorting seed plants such as grain, peas and turnip rapes. In the following specification, the treated plant is called grain, and the seeds respectively grains.

Traditionally there are two types of harvesting machines. In the older type, the machine is provided with a threshing roller transversal to the proceeding direction, which roller separates the grains from the spikes. After the threshing roller, the grain-straw mass is conveyed onto the beaters or flails provided after the roller, which flails separate the straw from the grains by utilizing gravitational force. From these flails, the grains are conveyed onto horizontal sieves, where the grains are cleaned by means of gravity and blowing. In the newer machine type, the threshing roller is an elongate, rotating drum, and the separation of grains from the straw takes place at the rear of this drum and by means of gravity. From the drum, the grains are transported onto the sieves in a similar fashion as in the older machines. The drawback of these machines is that the cutting, sorting and cleaning devices are installed successively, which leads to a large size and particularly to a considerable length in the combination.

In the prior art there is known a threshing apparatus introduced in the U.S. Pat. No. 4,274,426, which represents the above described newer machine type. The harvesting, i.e. the cutting and sorting of the grains, is arranged to take place in a rotating threshing and separating cylinder which is installed horizontally in the lengthwise direction. The threshing and separating are carried out by the action of centrifugal force. The grains are sieved and cleaned separately after the threshing and sorting. This kind of apparatus takes up a lot of space and is cumbersome in construction.

An example of harvesting machines provided with pedestal bearings is introduced in the U.S. Pat. No. 2,905,182, in which machine the sieve set is arranged to be rotatable. This sieve set, however, is small in area and is placed in the top part of the harvesting machine. In addition to this, the sieve set is geared so that the straw mass has to pass in between both the stationary and the moving support arms, which brings forth a danger of blocking of the machine.

SUMMARY OF THE INVENTION

The purpose of the invention is, among others, to eliminate the above mentioned drawbacks and to realize an improved harvesting machine, where the cutting, sorting and cleaning of the grains, as well as the transportation of the straw mass, is combined to be carried out in devices rotating around one and the same axis. This is achieved by means of the essential novel features of the invention which are enlisted in the appended patent claims.

The apparatus of the invention comprises means for feeding seed plants, such as grain, into the machine, a threshing unit and a sieve set for threshing the plants and for separating the seeds from the rest of the vegetable mass, means for recovering the seeds and means for removing the vegetable mass from the apparatus, in which apparatus the threshing unit is formed of a drum and of beaters or flails, which drum is conical and is fitted in the apparatus in a vertical position so that it widens from the bottom towards the top, and the flails are installed on the outer surface of the said drum;

the sieve set is formed of at least two sieves which are at least partly conical and are nested coaxially around each other and the threshing unit, so that the threshing space is located in between the drum and the said sieve set;

the shroud is conical, and the threshing unit and the sieve set are fitted inside the shroud, and in between the sieve set and the shroud there is provided a collecting bin, whereby the seeds are gathered to the bottom part of the collecting bin, where an opening is provided for removing them.

Among the advantages of the harvesting machine of the present invention, let us mention its compact structure, small size and light build. The surface areas in the threshing unit and sieve set of the apparatus are large; all parts are conical and fitted in a nested fashion. Consequently also the threshing and separating areas of the machine are large, and the apparatus as a whole is very efficient.

The rotating sieve set enables the installation of several successive sieves, which improves the cleaning efficiency. Moreover, the conical design of the sieve set causes the sieving operation to take place by the action of both gravity and centrifugal force, depending on the angle of inclination and speed of rotation of the sieve set. The rotating sieve set can, by means of a simple procedure, be provided with a cleaning brush. In the apparatus of the invention, the sieve set extends from the bottom up to the top, so that the sieving starts immediately after the grains are separated from the straw. The sieve set of the apparatus is geared at the bottom, in which case the danger of blocking is small.

BRIEF DESCRIPTION OF THE DRAWINGS

In the following the invention and its further advantages are explained in detail with reference to the appended drawing, where.

DESCRIPTION OF THE PREFERRED EMBODIMENTS

The apparatus of the invention according to FIG. 1, 2, 3 and 4 comprises the frame 1 and the shroud 2, which together form the housing of the apparatus. Inside the shroud 2, there are installed the threshing and sorting devices proper, complete with their feeding and discharge openings. The threshing unit is formed of the drum 3 and the flails 4. The drum 3 is conical and is fitted in the vertical position inside the shroud 2 so that it widens from bottom towards the top. The outer surface of the drum is provided with the flails 4.

Figure 1:
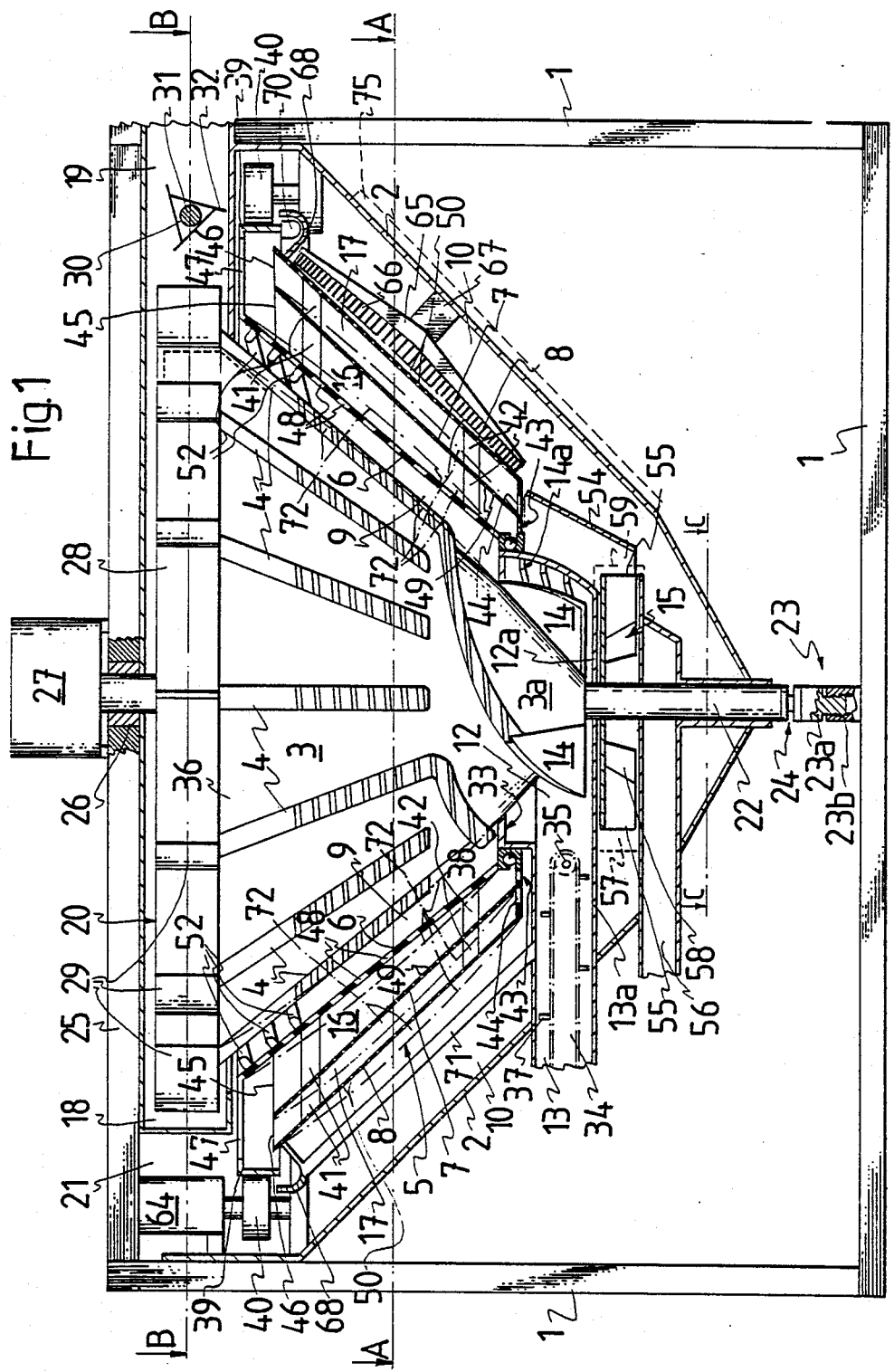
FIG. 1 is an illustration of the harvesting machine of the invention.
Figure 2:
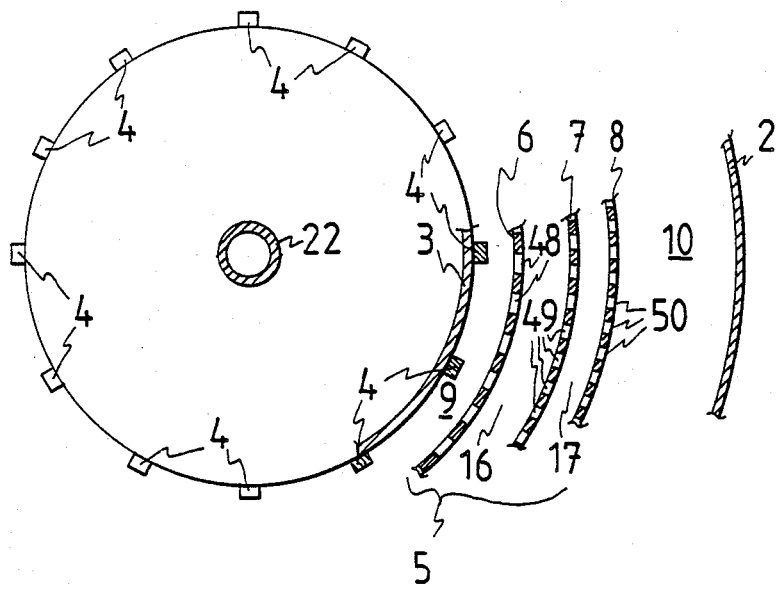
FIG. 2 is a cross-sectional illustration along the line A—A of the central part of the harvesting machine of FIG. 1.

The sieve set 5 serves as the sorting station. It is formed of at least two sieves, which are also conical. The number of conical sieves in the apparatus of FIG. 1 is three, i.e. the sieves 6, 7 and 8, which are fitted coaxially with respect to each other. The sieve set 5 is fitted coaxially around the threshing unit 3, 4. In between the threshing unit, i.e. the drum 3 and the flails 4, and the sieve set 5, there is formed the threshing space 9 proper.

The shroud 2 is conical in shape. The drum 3, the flails 4 and the sieve set 5 are fitted inside the shroud 2. In between the sieve set 5 and the shroud 2, there is located the collecting bin 10, wherethrough the grains are gathered to the bottom part of the collecting bin, which is provided with an opening 11 (FIG. 4) for the removal of the grains. The bottom part of the drum 3 is fitted inside the transition chamber 12. The feed channel 13 is connected to the transition chamber 12 from outside of the apparatus. The bottom part of the drum, located in the transition chamber 12, is provided with blades 14. The blades 14 are advantageously wound upwards in a spiralling fashion. By means of them, the grain is lifted from the feed channel 13 and the transition chamber 12 up to the threshing space 9 proper.

The apparatus includes a blower 15, which is from below connected to the intermediate space 16, 17 of the sieves 6, 7 and 8 of the sieve set 5. The discharge chamber 18, containing the first outlet channel 19, is arranged in the top part of the threshing unit. The discharge chamber 18 is provided with a fan blower 20, which is connected to the top part of the drum 3, so that the fan blower 20 rotates along with the drum 3. The second outlet channel 21 is connected to the top part of the sieve set 5.

Vertically in the middle of the drum 3, there is fitted the vertical axis 22. Thereby the drum 3 is rotatably geared to the frame 1 of the apparatus. The vertical axis 22 rests against the stationary support 23, which is connected to the frame 1. In between the bottom end of the vertical axis 22 and the support 23, there is fitted a bearing, such as a thrust bearing 24. The top end of the vertical axis 22 is brought through the top beam 25 of the frame 1 and can be provided with a bearing 26. The vertical axis 22 is connected, via a suitable intermediate means, to an actuator 27 such as an electric motor, whereby the vertical axis 22 and the drum 3 connected thereto can be rotated.

In connection with the drum 2, there are arranged the flails 4. In structure the flails 4 represent for instance some as such known type of flails which are generally used in combined harvesters. The flails can be arranged on the surface of the top part of the drum 3, from bottom to top, as is illustrated in FIG. 1. The flails can also be designed to rise in a spiralling fashion, similarly as in the bottom part of the drum 3 in FIG. 1. In general the flails 4 can be formed of straight and curved parts by arranging them at suitable intervals on the outer surface of the drum 3.

The bottom part 3a of the drum 3 is provided with at least one, advantageously two, blades 14, which are wound upwards in a screw-like fashion. This bottom part 3a of the drum 3 is fitted inside the transition chamber 12, as was mentioned above. The bottom part 3a of the drum can be a separate part connectable to the drum and provided with blades 14. In shape it can also be other than conical, for example cylindrical. However, the essential thing is that the vegetable mass, such as grain, to be treated by means of this member and the blades 14, is conveyed from the transition chamber 12 into the threshing space 9.

Figure 3:
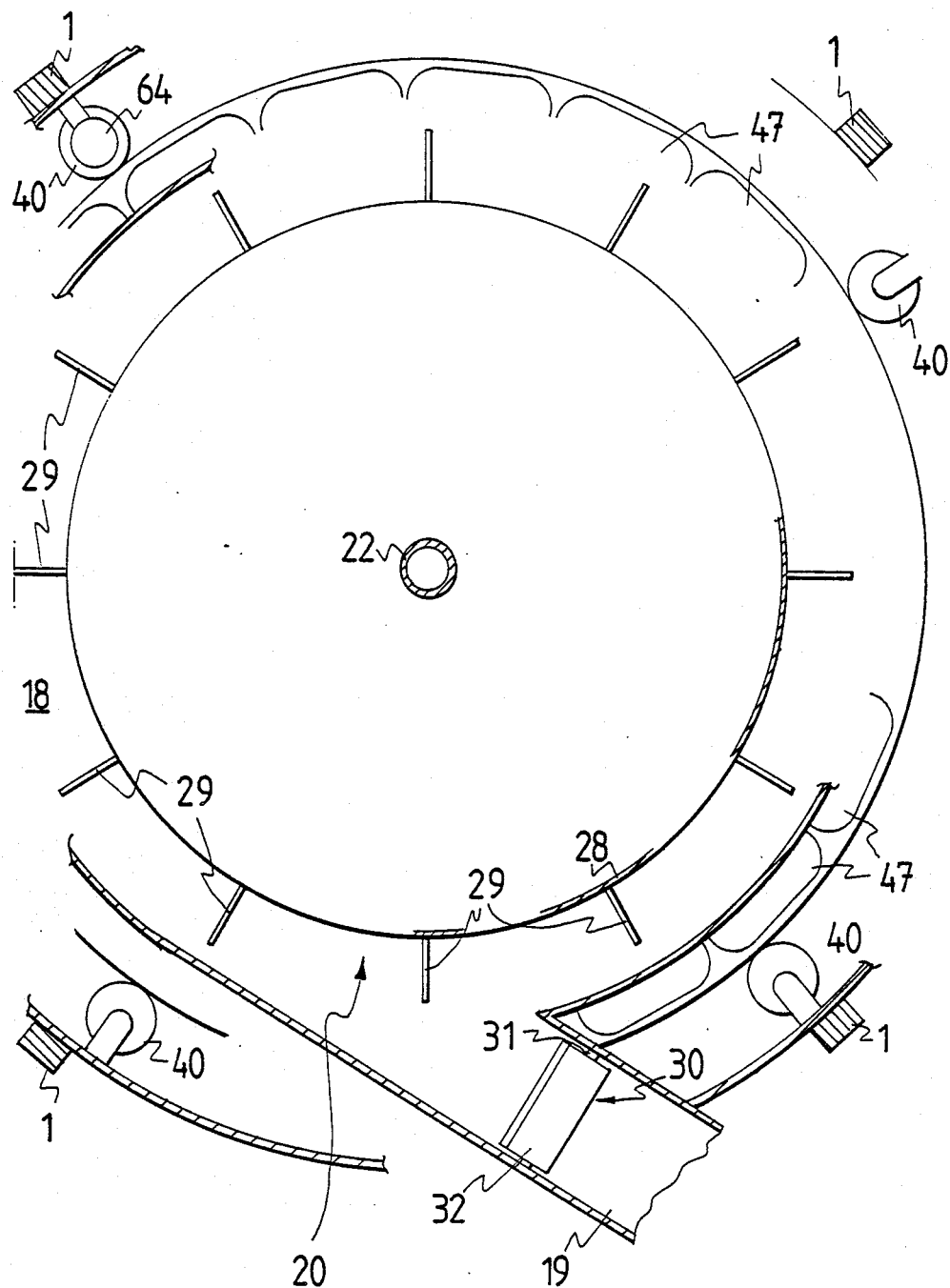
FIG. 3 is a cross-sectional illustration along the line B—B of the top part of the harvesting machine of FIG. 1.
Figure 4:
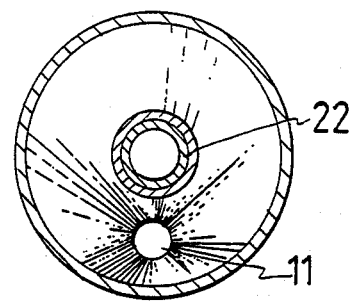
FIG. 4 is a cross-sectional illustration along the line C—C of the bottom part of the harvesting machine of FIG. 1.

In the top part of the shroud 2 and the drum 3 there is provided the discharge chamber 18. The discharge chamber 18 is advantageously attached to the frame 1. In this preferred embodiment, the discharge chamber 18 is a cylindrical space wherefrom the first outlet channel 19 leads to the exterior of the apparatus. The channel 19 is arranged tangentially in connection with the cylindrical casing of the discharge chamber 18, as is seen in FIG. 3. In the top part 3b of the drum 3 there is provided the fan blower 20. This is attached, by means of a cylindrical member 28, to the top part 3b of the drum 3, as is illustrated in FIG. 1. The blades 29 of the fan blower 20 are directed radially outwards from the cylinder part.

In the first outlet channel 19, there can be installed a discharge device 30 for the removal of straws and other such vegetable elements. The discharge device 30 comprises a rotating axis 31 and blades 32 connected thereto. By means of the discharge device 30, the blocking of the outlet channel 19 is prevented particularly if the stems of the plants under treatment are long and stiff. The discharge device 30 is an auxiliary help which is not, however, absolutely necessary in the harvesting machine of the invention.

The transition chamber 12 is open at the top so that the drum 3, together with the connected intervals, can be installed in place through the top of the apparatus. The transition chamber 12 is connected to the threshing space 9 by means of an annular chamber 33. The bottom 12a of the transition chamber 12 is stationary and is directly connected to the bottom 13a of the feed channel 13. A feeder 34 is fitted in the feed channel 13. The feeder 34 comprises for instance an endless band 36 which is provided with transport members 37. The endless band 36 is arranged to circulate around the rotating end support 35. The other end of the feeder 34 and the connected actuator for moving the endless band are not illustrated in the drawings, because they are not essential from the point of view of the invention. It is naturally clear that a conveyor of some other type can also be used in connection with the feed channel 13. The feed channel 13 can also be arranged so that a feeder is not needed at all.

The inner surface of the transition chamber 12 can be provided with blades 14a, which correspond to the blades 14 provided in the bottom part of the drum. By means of the blades 14a, the shifting of the grain upwards to the threshing space can be made more effective.

The bottom of the sieve set 5 is supported against the top part of the transition chamber 12. In between the sieve set 5 and the transition chamber 12, there is fitted at least one bearing such as a thrust bearing 38, which enables free rotation of the sieve set 5 with respect to the shroud 2 and the drum 3. The top part of the sieve set 5 is advantageously provided with an annular member, for instance a flange or a cylinder 39. They are not, however, essential for the operation of the apparatus.

With the annular member 39, the sieve set 5 is supported, by means of rollers 40 or corresponding members, against the shroud 2 or directly against the frame 1. One of the rollers 40 is provided with an actuator such as an electric motor 64, whereby the sieve set 5 can be rotated in the desired direction, advantageously in a direction opposite to the rotation of the drum 3.

Figure 5:
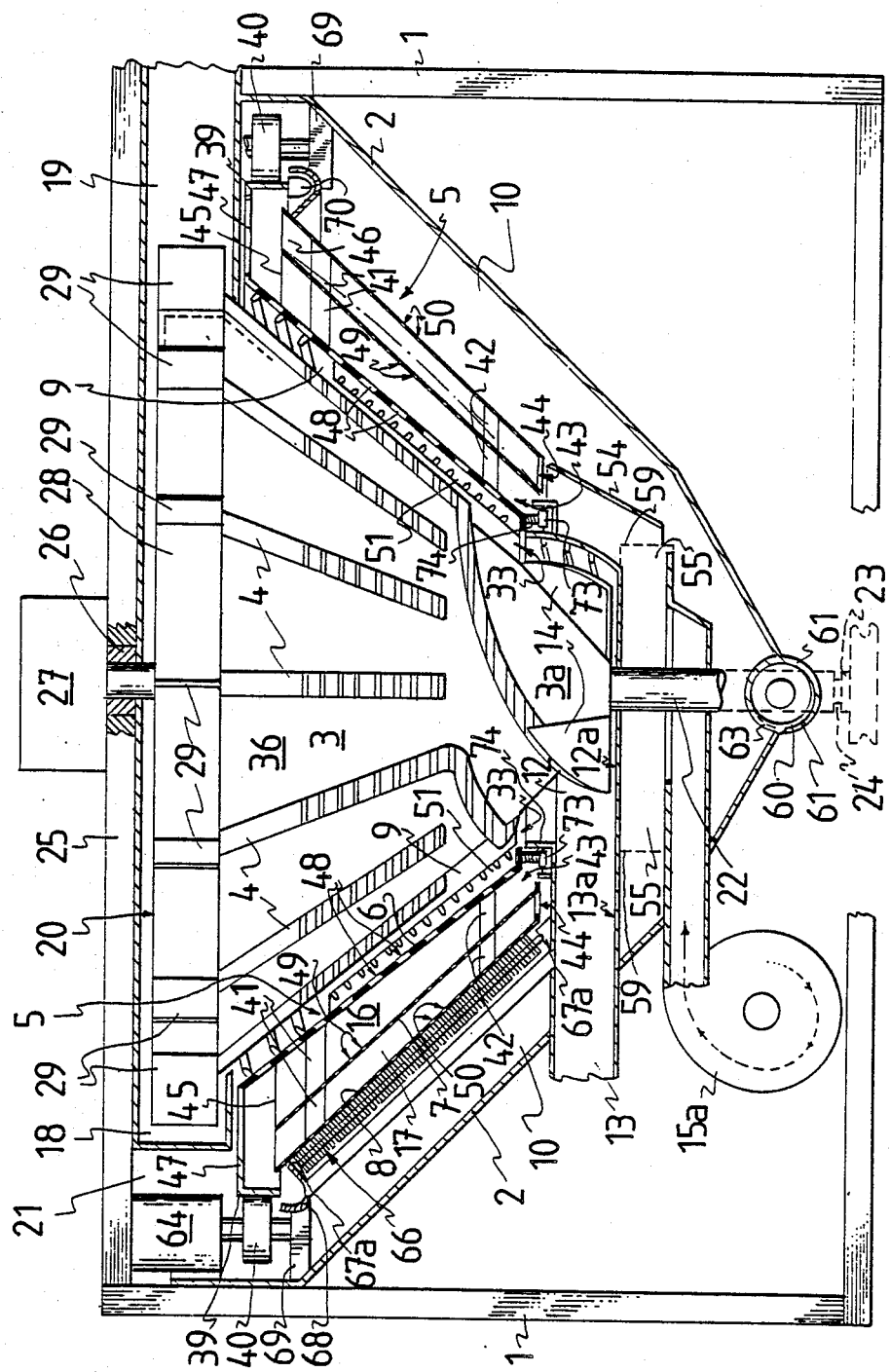
FIG. 5 is an illustration of another harvesting machine of the invention.

In the embodiment of FIGS. 1 and 5, the sieve set 5 comprises three sieves, 6, 7 and 8. The sieves are interconnected by means of supports 41 and 42. The supports 41 are placed in the top part of the sieve set, and the supports 42 are placed in the bottom part. They are located along an imaginary circle orbit, for instance at intervals of 60° from each other. The supports 41, 42 are advantageously elongate, pin-like members. In that case air is free to flow upwards, and the grains are free to flow downwards unobstructed. In between the sieves 6, 7 and 8, there are located the intermediate spaces 16 and 17. The intermediate spaces 16 and 17 are connected to the space below the sieve set 5 via the openings 43, 44, and to the space above the sieve set 5 via the openings 45, 46. The annular member 39, which is connected to the top part of the sieve set 5, is also provided with openings 47. The intermediate spaces 16, 17 are thus connected to the second outlet channel 21 via the openings 45, 46 and 47.

Consequently the sieve set 5 comprises at least two sieves 6, 7 which are conical or other similar devices widening from the bottom towards the top. The sieves, which in the embodiment of FIG. 1 are three in number, i.e. 6, 7 and 8, are attached at intervals from each other by means of the supports 41, 42. The intermediate spaces 16, 17 of the sieves can be adjusted to be suitable by adjusting the length of the supports, according to the vegetable material in question. The first sieve 6 is the innermost sieve in the nested sieve set, and it is placed nearest to the drum 3. The perforations 48 in the first sieve 6 are large in comparison with the perforations 49, 50 of the second and third sieves 7 and 8. The second sieve 7 is placed outside the drum 3 and the first sieve 6, and respectively the third sieve 8 is placed outside the second sieve 7. The drum 3 and the sieve set 5, complete with the sieves 6, 7 and 8, is thus formed of parallel, coaxially rotatable members.

The drum 3 and the sieve set 5 can include culminating points 72, where the angle of inclination between them, with respect to the vertical axis, changes. This kind of drum and sieve are illustrated by dash lines in FIG. 1.

In connection with the first sieve 6 of the sieve set 5, in the threshing space 9, there can be arranged, when necessary, a set of counterflails 51, as is illustrated in FIG. 5. In structure these flails 51 are advantageously similar to the flails 4 connected to the drum proper 3. The counterflails 51 are not always needed, and their use depends on the material to be threshed.

The top part of the innermost sieve 6 in the sieve set 5 can be provided with guides 52. They can be either plate-like or pin-like members protruding from the surface of the sieve 6 towards the drum 3. Their purpose is to slow down the progress of the vegetable mass in the threshing space 9 and thus make the threshing operation more efficient. They are not, however, necessary for the operation of the machine for instance when treating grain, and they can be omitted from the apparatus.

Below the transition chamber 12, there is fitted a blower 15. This blower comprises a blower chamber 57 and a fan blower 58. The blower chamber 57 is connected, by means of an air inlet channel 56, to the exterior of the apparatus, and by means of an outlet 55 to the interior of the shroud 2. The outlet 55, connected to the blower chamber, is advantageously annular in shape, and is provided with a protecting screen 59 which is fastened around it. The fan blower 58 is attached to the vertical axis 22 so that it rotates along with the vertical axis.

Beneath the sieve set 5 and outside the transition chamber 12, there is installed a guide flange 54, which is advantageously a conical member widening from the bottom towards the top. This is fastened to the shroud 2. The bottom part of the guide flange 54 is located roughly on the same level as the bottom edge of the outlet 55 of the blower 15, so that the air obtained from the blower 15 is guided, by means of the guide flange 54, mostly upwards, towards the sieve set 5. The top edge of the guide flange 54 is roughly on the same level as the bottom edge of the outermost sieve 8 of the sieve set 5.

The collecting bin 10 is formed in the space between the sieve set 5 and the shroud 2, and it continues downwards towards the bottom part of the conical shroud 2. The bottom part of this bin 10 is provided with an opening 60, wherethrough the seeds are recovered from the machine. In connection with the opening 60, there can be arranged a conveyor, such as the screw conveyor 61 in FIG. 5, whereby the grain mass can be discharged from the machine. The bottom part of the collecting bin 10 is, in the embodiment of FIG. 5, formed to be conically narrowing in shape, and in the middle part thereof there is arranged a chute 62 and a tubular connection 63, whereto the said screw conveyor 61 is fitted.

Against the outermost sieve 8 of the sieve set 5, there is fitted a brush 65 as is illustrated in FIG. 1. The purpose of the brush 65 is to try and prevent the blocking of the perforations 50 of the sieve 8. The brush section 66 proper of the brush 65 extends from the top, from the top edge of the sieve 8, vertically down as far as the bottomedge of the same sieve 8. The brush 65 is fastened, by means of the support 67, directly to the shroud 2.

The brush 65 can also be realized in another fashion, as is apparent from FIG. 5. The brush section 66 of the brush is formed of a brush roller, the axis whereof is rotatably attached to a suitable support 67a. The support 67a is attached to the frame structures 1, 2 of the apparatus.

In the vicinity of the top part of the sieve set 5, there is arranged a chute 68, which is fastened, by means of supports 69, to the shroud 1. The top part of the sieve set 5 is provided with at least one member 70, which is fitted to proceed in the said chute 68 while the sieve set 5 rotates. The chute 68 is connected, by at least one outlet pipe 71, to the feed channel 13. Thus the material accumulated in the chute 68 can, by means of the member 70, be transported via the outlet pipe 71 to the feed channel 13 and further via the transition chamber 12 to rethreshing in the threshing space 9. Alternatively the outlet pipe 71 can be connected to the exterior of the apparatus.

Figure 7:
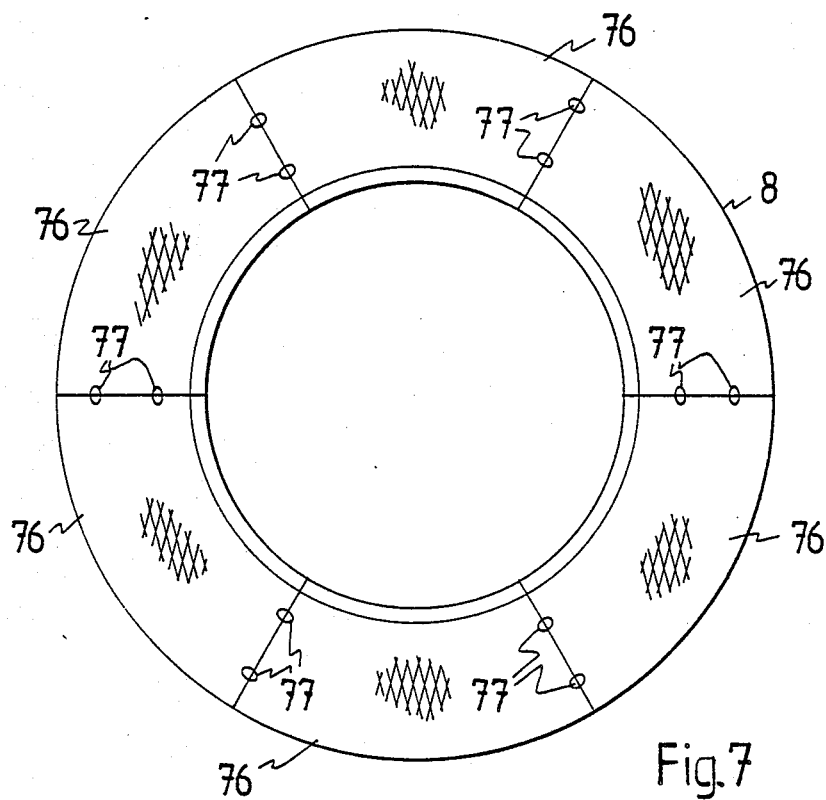
FIG. 7 is a top-view illustration of a single sieve of the sieve set.

The harvesting machine of the invention can be provided with a maintenance door 75, which is placed in the shroud 2 (FIG. 1). Through the maintenance door 75, it is possible to handle the sieve set 5 and connected members without having to dismount the drum 3 and the sieve set 5 from the shroud 2. The maintenance door 75 is most advantageously of the same height as the conical part of the sieve set 5. In that case it is also advantageous that the sieves 6, 7 and 8 of the sieve set 5 are composed of elements which are segments or parts of a truncated cone. FIG. 7 is a top-view illustration of the outermost sieve 8 as dismounted from the apparatus. The members 76 of this sieve are interconnected at edges for instance by means of screws, which are easily unfastened. Through the maintenance door 75, the members of the sieve 8 can be detached from each other and lifted out through the door, whereafter they can be replaced by new or different members.

FIG. 5 illustrates another harvesting machine according to the present invention, which already has been referred to in the above description. This apparatus corresponds, in all essential parts, to the harvesting machine of FIG. 1, and same reference numbers for same parts are used.

In the embodiment of FIG. 5, the blower 15a is placed outside the shroud 2 and connected, by means of the air inlet channel 56, to the chamber 57. The chamber 57 is connected to the rest of the apparatus in similar fashion as in FIG. 1.

If necessary, the feed channel 13 can be provided with a feeder, whereby the material under treatment is transported to the transition chamber 12.

The sieve set 5 is geared, by means of rolling bearings 73, to the housing 1, 2 of the apparatus. The bottom part of the sieve set 5 is provided with a support frame 74. The rolling bearings 73 are fitted beneath the support frame 74, and they are attached to the top part of the transition chamber 12, and thereby to the shroud 2.

Figure 6:
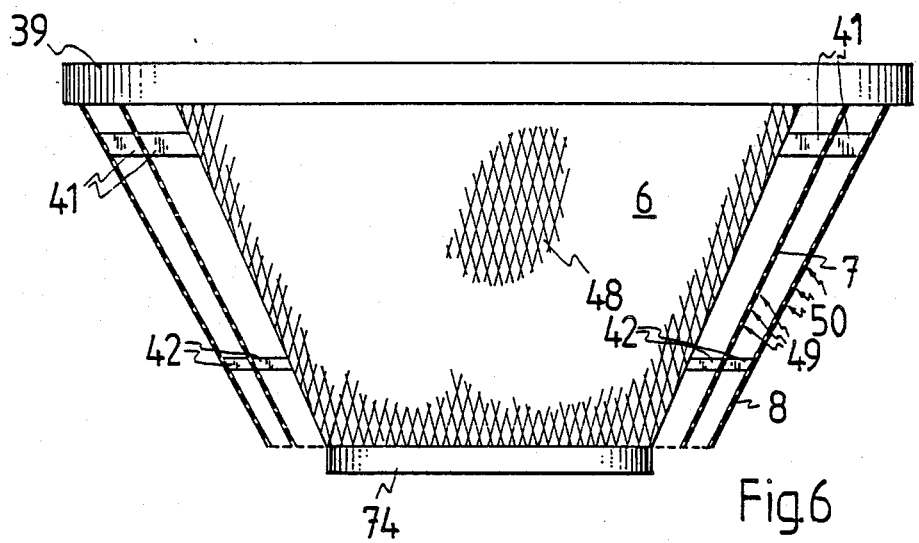
FIG. 6 is an illustration of the sieve set.

The sieves 6, 7 and 8 of the sieve set 5 can be formed of a mesh provided with vertical, elongate perforations 48, 49, 50 having the shape of a parallelogram or a lozenge, as is illustrated in FIG. 6. In the innermost sieve, the size of these perforations 48 can be for instance 20×40 mm (horizontal×vertical measure). Towards the outermost sieve 8, the perforations are reduced in size sieve by sieve. The perforations of the sieves 6, 7 and 8 of the sieve set 5 can naturally also be round or elliptical or designed in some other suitable geometrical shape. The advantages of the above mentioned lozenge-shaped perforations are, among other things, that the sieves 6, 7 and 8 of the sieve set 5 work effectively and that they can be made of a material which is easily available.

The harvesting machine of the invention is operated as follows. In the threshing operation, grain or some other cut vegetable mass is fed, via the feed channel 13 and by means of the feeder 34, into the transition chamber 12. The blades 14 provided in the bottom part 3a of the drum 3 lift the grain up to the threshing space 9, i.e. to the space formed in between the drum 3 and the sieve set 5 which rotate with respect to each other. The rotating blades 14 suck air into the threshing space 9 via the feed channel 13 and thus contribute, together with the blades 14, in the lifting of the grain to be threshed into the threshing space 9. The drum 3 and the flails 4 operating as the threshing unit beat the grain and throw it against the innermost sieve 6 of the sieve set 5 which serves as the flail bridge. The grain to be threshed is transported upwards in the threshing space 9 by the action of centrifugal force and air flow. In the course of threshing, the flails 4 provided in connection with the drum, and the guides 52 of the innermost sieve 6, also shift the straw mass forward, and finally direct it to the discharge chamber 18. The fan blower 20 transports the refuse material further out of the machine via the outlet channel 19.

The separating surface of the sieve set 5 extends from its bottom part up to the top. Thus, simultaneously with the threshing, the seeds such as grains are cleaned in the sieve set 5 by means of the action of centrifugal and gravitational forces, which action is boosted by the air flow generated by the blower 15; 15a (FIGS. 1 and 5). The air flow created by the blower 15, 15a proceeds through the outlet 55 to the bottom part of the sieve set 5 and further through the intermediate spaces 16, 17 of the sieve set 5 upwards and out via the second outlet channel 21. Along with the air flow, there is discharged chaff which is lighter than the seeds, and thus the chaff is separated from the seeds. The inclination and speed of rotation of the sieve set 5 are adjusted so that the seeds in the sieve set 5 are lifted upwards to a wider space and further transported through the perforations 48, 49, 50 of the sieves 6, 7, 8 to the collecting bin 10. The perforation of the sieves 6, 7, 8 of the sieve set 5 is chosen so that the sieving with each vegetable material to be treshed is as effective as possible. The sieved grains are shifted from the collecting bin 10 along the conical surface of this bin 10, i.e. along the shroud 2, down to the bottom part of the bin, and further out via the opening 11; 60 (FIGS. 1 and 5). In connection with the opening 60, or beneath it, there may be a suitable conveyor as was pointed out above. The possibly untreated, only partially threshed spikes or similar vegetable elements can be collected in the chute 68 located in the top part of the sieve set 5 and transported, via the outlet pipe 71, to rethreshing. The cleanness of the outermost sieve 8 can be improved by means of a brush 65, placed in the collecting bin 10.

The drum 3 serving as the threshing apparatus is geared, at the bottom part of the vertical axis 22, to the support 23 by means of a bearing 24. The support 23 can be arranged to be adjustable in length, for instance so that it is formed of two threaded elements 23a, 23b which can be screwed together, as is illustrated in FIG. 1. By winding these elements, the length of the support can be adjusted. By increasing the length of the support 23, the drum 3 can be lifted, and simultaneously the cross-gap in the threshing space 9 can be adjusted. The bearing 24 also enables a simple detaching operation of the drum 3 during the maintenance of the apparatus. The sieve set 5 is also easily dismountable from the machine for maintenance after the drum 3 has been detached.

The efficiency of the threshing equipment and the size of the sieve set 5 can be chosen to be sufficient by means of adjusting the diameters, height and angle of inclination of the drum 3 and the sieve set 5. The angle of inclination of the sieve set 5 does not necessarily have to be equal to that of the drum 3, but it can be slightly larger. The mutual distances of the sieves 6, 7, 8 can also be adjusted according to the needs of each case. The conical shape of the drum 3 and the sieve set 5 means that the threshing and separating spaces, i.e. the spaces 9, 16 and 17, become wider when proceeding upwards and outwards, and along with the progress of the threshing and sorting process. This means that the process does not include any serious danger of blocking.

In the above description the invention has been explained with reference to a few preferred embodiments only, but it is naturally clear that the invention is no to be limited in them but to be understood in a wider sense, within the scope of the inventional idea specified in the appended patent claims.

I claim:
1. A harvesting machine comprising means for feeding seed plants with seeds such as grain into the ma- chine, a threshing unit and a sieve set for threshing said seed plant and for separating the seeds from the rest of the vegetable material, means for recovering the seeds from the machine and means for removing the residual vegetable material characterized in that in the apparatus the threshing unit is formed of a drum having an outer surface and of beaters or flails, which drum is conical and is fitted in the apparatus in a vertical position so that it widens from the bottom towards the top, and the flails are installed on the outer surface of the said drum;

the sieve set being formed of at least two sieves which are at least partly conical and are nested coaxially around each other and the threshing unit a threshing space defined between said drum and said sieve set;

a conical shroud, and the threshing unit and the sieve set are fitted inside the shroud, and in between the sieve set and the shroud there is provided a collecting bin, whereby the seeds are gathered to the bottom part of the collecting bin, where an opening is provided for removing them.

2. The apparatus of claim 1, characterized in that the sieve set is installed to be supported by a bearing, so that it can be rotated with respect to the drum.

3. The apparatus of claim 1, characterized in that the top part of the sieve set is provided with a cylindrical part, which is supported in the housing by means of rollers, one of which rollers includes an actuator, such as an electric motor, for rotating the sieve set.

4. The apparatus of claim 1, characterized in that a second outlet channel is connected to the top part of the sieve set.

5. The apparatus of claim 1, characterized in that said sieve set includes an outermost sieve and a brush in said outermost sieve.

6. The apparatus of claim 5, characterized in that the brush is attached, by means of a support, to the housing of the apparatus.

7. The apparatus of claim 5, characterized in that the brush is rotatably geared to a support in the vicinity of the outermost sieve.

8. The apparatus of claim 1, characterized in that in the vicinity of the top part of the sieve set, there is arranged a chute which is attached, by means of supports, to the shroud, and that the top part of the sieve set is provided with at least one member which is fitted to proceed in the said chute during the rotation of the sieve set, and that an outlet pipe is connected to the chute.

9. The apparatus of claim 1, characterized in that the sieve set is combined of separate, detachably interconnected elements.

10. The apparatus of claim 9, characterized in that the shroud of the apparatus is provided with a maintenance door.

11. The apparatus of claim 1, characterized in that said drum has a vertical axis which is at the bottom connected, by means of a thrust bearing and a member adjustable in length, the housing so that the vertical position of the drum with respect to the sieve set can be adjusted.

12. The apparatus of claim 1, characterized in that said drum has a top part with a discharge chamber provided with a first outlet channel wherein a blower is installed.

13. The apparatus of claim 12, characterized in that said blower has a vertical axis and the blower is a fan blower and that it is connected to the vertical axis of the drum.

14. The apparatus of claim 1, characterized in that said sieve set includes an innermost sieve formed of a mesh provided with vertical perforations having the shape of an elongate parallelogram.

* * * * *